United States Patent
Ueda et al.

(10) Patent No.: US 7,811,712 B2
(45) Date of Patent: Oct. 12, 2010

(54) FUEL CELL SYSTEM AND OPERATION METHOD THEREOF

(75) Inventors: Tetsuya Ueda, Aichi (JP); Hideo Ohara, Osaka (JP); Akinari Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 940 days.

(21) Appl. No.: 11/632,454

(22) PCT Filed: Oct. 17, 2005

(86) PCT No.: PCT/JP2005/019050
§ 371 (c)(1),
(2), (4) Date: Jan. 16, 2007

(87) PCT Pub. No.: WO2006/041185
PCT Pub. Date: Apr. 20, 2006

(65) Prior Publication Data
US 2007/0248856 A1 Oct. 25, 2007

(30) Foreign Application Priority Data
Oct. 15, 2004 (JP) .............................. 2004-301183

(51) Int. Cl.
*H01M 8/04* (2006.01)
*H01M 8/06* (2006.01)
*H01M 8/18* (2006.01)

(52) U.S. Cl. ...................... 429/429; 429/428; 429/430; 429/416; 429/417; 429/423; 429/425

(58) Field of Classification Search .................. 429/12, 429/13, 17, 22, 23, 34
See application file for complete search history.

(56) References Cited
U.S. PATENT DOCUMENTS
6,514,635 B2 * 2/2003 Van Dine et al. .............. 429/17
(Continued)

FOREIGN PATENT DOCUMENTS
JP 2-87480 A 3/1990
(Continued)

OTHER PUBLICATIONS
Akimoto et al. (JP 2003-229156) machine translation, Aug. 2003.*

*Primary Examiner*—Patrick Ryan
*Assistant Examiner*—Julian Mercado
(74) *Attorney, Agent, or Firm*—McDermott Will & Emery LLP (57) ABSTRACT

There is disclosed a fuel cell system according to the invention comprising; a material gas feeder (1); a reformer (3); a fuel cell (4); a combustor (5); communication passages (6A-6E); and a controller (20),
wherein during a shutdown period of the fuel cell (4), the controller (20) determines whether the fuel cell system is in a normal condition where a shutdown operation of the fuel cell (4) is performed; and wherein if the controller (20) determines that the fuel cell system is not in the normal condition, the controller (20) controls the material gas feeder (1) to execute a material gas feed process before a next ignition of the combustor (5), the material gas feed process being performed such that the material gas is supplied to a hydrogen-containing gas flow path constituted by the reformer (3) and the communication passages (6A-6E) located between the reformer (3) and the combustor (5).

9 Claims, 3 Drawing Sheets

U.S. PATENT DOCUMENTS

2003/0068540 A1    4/2003    Ueda et al.

FOREIGN PATENT DOCUMENTS

| JP | 8-124588 A | 5/1996 |
| --- | --- | --- |
| JP | 2003-86222 A | 3/2003 |
| JP | 2003-100332 A | 4/2003 |
| JP | 2003-229156 A | 8/2003 |
| JP | 2003-303608 A | 10/2003 |
| JP | 2004-196584 A | 7/2004 |
| JP | 2005-63883 A | 3/2005 |
| JP | 2005-71949 A | 3/2005 |
| JP | 2005-247648 A | 9/2005 |

* cited by examiner

FUEL CELL SYSTEM AND OPERATION METHOD THEREOF

RELATED APPLICATIONS

This application is the U.S. National Phase under 35 U.S.C. §371 of International Application No. PCT/JP2005/019050, filed on Oct. 17, 2005, which in turn claims the benefit of Japanese Application No. 2004-301183, filed on Oct. 15, 2004, the disclosures of which Applications are incorporated by reference herein.

TECHNICAL FIELD

The present invention relates to a fuel cell system and an operation method thereof and, more particularly, relates to a fuel cell system having a reformer provided with a combustor and an operation method thereof.

BACKGROUND ART

Fuel cells generally use hydrogen-rich gas (hereinafter referred to as "hydrogen-containing gas") as a fuel. The hydrogen-containing gas is mainly generated through a steam reforming reaction between hydrocarbon-based material gas and steam. A typical reforming system (hydrogen generator) for generating the hydrogen-containing gas is composed of a reformer, a shift converter and a selective oxidizer. Since the steam reforming reaction is encouraged by a catalytic action, the reforming system includes a combustor such as a burner and is designed to heat the material gas etc. to a catalytic temperature while generating steam.

A typical fuel cell system is composed of a material gas feeder, a reformer, a fuel cell and a combustor which are aligned in order so as to be communicated with one another by means of a communication passage. Thereby, the material gas is converted into a hydrogen-containing gas that is, in turn, used in an electrochemical reaction in the fuel cell and excessive hydrogen-containing gas discharged from the fuel cell is efficiently used as a fuel for the combustor.

When shutting down the fuel cell, an inert gas or the like is allowed to flow within the fuel cell system. With this shutdown process, the hydrogen-containing gas remaining in the fuel cell system can be purged (purging treatment). As a typical purging treatment, a method for supplying an inert gas (e.g., nitrogen) to the reformer is generally taken. There has been proposed another purging treatment (e.g., Patent Document 1) according to which the material gas (e.g., city gas) used for generating a hydrogen-containing gas is supplied to the reformer etc. of the fuel cell system, the hydrogen-containing gas within the fuel cell system is purged by the material gas, and then the fuel cell system is sealed with the material gas.

Patent Document 1: Japanese Laid-Open Patent Application Publication No. 2003-229156

DISCLOSURE OF THE INVENTION

Problems that the Invention is to Solve

However, use of a system for supplying inert gas leads to an increase in the manufacturing cost and installation space of the fuel cell system. Further, the fuel cell system disclosed in Patent Document 1 has revealed the problem that if the above-described normal shutdown process cannot be performed for some reason such as a power failure and malfunction or false operation of the fuel cell system (i.e., when the fuel cell system is not in a normal condition), and more specifically if a regulating valve etc. for sealing the fuel cell system is left in an open state while the hydrogen-containing gas remaining in the fuel cell system, the fuel cell system will be exposed to the atmosphere.

Therefore, when the fuel cell is not in its normal condition, the hydrogen-containing gas remaining in the fuel cell system contracts in volume as the internal temperature of the fuel cell system drops and air enters the fuel cell system, so that the hydrogen of the hydrogen-containing gas is mingled with the oxygen of the air. As a result, when the combustor such as a burner operates at the time of restarting the fuel cell system, abnormal combustion such as backfire may occur within the fuel cell system, causing damage to the communication passage, the reformer, the fuel cell and others.

Means for Solving the Problems

The invention is directed to overcoming the above problems and a primary object of the invention is therefore to provide a fuel cell system and an operation method thereof that are capable of preventing occurrence of abnormal combustion at the time of igniting the combustor when the fuel cell system is not in a normal condition, while avoiding an increase in the manufacturing cost and installation space of the fuel cell system and wasteful supply of material gas.

The above problem can be solved by a fuel cell system according to a 1st aspect of the invention, the fuel cell system comprising: a material gas feeder configured to supply a material gas; a reformer configured to reform the material gas into a hydrogen-rich hydrogen-containing gas; a fuel cell; a combustor configured to burn the material gas or the hydrogen-containing gas to supply heat to the reformer; a communication passage configured to connect the material gas feeder, the reformer, the fuel cell and the combustor in order such that they are communicated with one another; and a controller, wherein during a shutdown period of the fuel cell, the controller determines whether the fuel cell system is in a normal condition where a shutdown operation of the fuel cell is performed, and wherein if the controller determines that the fuel cell system is not in the normal condition, the controller controls the material gas feeder to execute a material gas feed process before a next ignition operation of the combustor, the material gas feed process being performed such that the material gas is supplied to at least a part of a hydrogen-containing gas flow path constituted by the reformer and the communication passage located between the reformer and the combustor. This arrangement obviates a need for an inert gas feeding system so that occurrence of abnormal combustion at the time of ignition of the combustor when the fuel cell system is not in its normal condition can be avoided while restraining an increase in the manufacturing cost and installation space of the fuel cell system. In addition, since the condition of the fuel cell system is checked, occurrence of abnormal combustion at the time of ignition of the combustor can be prevented while avoiding wasteful supply of the material gas.

The normal condition as stated herein means the condition of the fuel cell system in which the shutdown operation of the fuel cell is performed. It also includes the condition in which the fuel cell system executes the shutdown operation and the condition after executing the shutdown operation is not maintained.

The hydrogen-containing gas flow path as stated herein means a flow path in which the hydrogen-containing gas flows from the reformer to the combustor bypassing the fuel cell or a flow path in which the hydrogen-containing gas flows from the reformer to the combustor by way of the fuel cell.

According to a 2nd aspect of the invention, there is provided a fuel cell system wherein the controller causes the material gas feeder to execute the material gas feed process at least just before the next ignition of the combustor. With this arrangement, if it is determined that the fuel cell system is not in its normal condition, the material gas feed process is performed by use of the material gas just before ignition of the fuel cell system. Therefore, occurrence of abnormal combustion at the time of ignition of the combustor can be more reliably prevented.

According to a 3rd aspect of the invention, there is provided a fuel cell system wherein the controller causes the material gas feeder to execute the material gas feed process at least during a shutdown period of the fuel cell. With this arrangement, if it is determined that the fuel cell system is not in its normal condition during the shutdown period of the fuel cell, the material gas feed process is performed by use of the material gas. Therefore, air that has entered the hydrogen-containing gas flow path can be reduced or purged in an early time after shutdown of the fuel cell.

According to a 4th aspect of the invention, there is provided a fuel cell system, wherein the controller causes the material gas feeder to supply the material gas at least in an amount equivalent to a volume of the hydrogen-containing gas flow path in the material gas feed process. With this arrangement, the material gas can be supplied in an amount necessary for reducing or purging the air that has entered the hydrogen-containing gas flow path.

According to a 5th aspect of the invention, there is provided a fuel cell system, wherein if the controller determines that the fuel cell system is not in the normal condition, the controller prolongs an igniting operation time in the next ignition operation of said combustor. Incidentally, even if the oxygen content of air that has entered the hydrogen-containing gas flow path is reduced and the concentration of hydrogen in the hydrogen-containing gas becomes equal to or higher than the upper limit of the combustible concentration, an incombustible gas component (e.g., nitrogen) of the air will be left so that there remains a possibility that ignition of the combustor may be disturbed, unless the air that has entered the path is completely purged. Therefore, it takes time to ignite the combustor after the residual gas is discharged from the combustor and a failure in ignition of the combustor is likely to occur. The above arrangement, however, makes it possible to smoothly perform the start-up operation of the fuel cell without causing a failure in ignition.

According to a 6th aspect of the invention, there is provided a fuel cell system comprising: a first valve placed in the communication passage located between the material gas feeder and the reformer; a second valve placed in the communication passage located between the fuel cell and the combustor; a third valve placed in the communication passage located between the fuel cell and the second valve; a branch passage configured to connect the communication passage located between the reformer and the fuel cell to the communication passage located between the third valve and the second valve; and a three-way valve placed at a joint between the communication passage located between the reformer and the fuel cell and the branch passage, wherein the controller performs: a fuel cell isolating operation for isolating the fuel cell from the fuel cell system by controlling the third valve and the three-way valve in the shutdown operation of the fuel cell; a material gas feed operation for supplying the material gas to the communication passage excluding the isolated part, to the reformer and to the combustor, by controlling the first and second valves and the material gas feeder after the fuel cell isolating operation; and a closing operation for closing the hydrogen-containing gas flow path by controlling the first and second valves after the material gas feed operation. With this arrangement, the fuel cell is left in a condition where it is filled with the hydrogen-containing gas containing steam, when the fuel cell system is in its normal condition. Therefore, the wet condition of the polymer electrolyte membrane can be maintained and the deterioration of the performance of the polymer electrolyte fuel cell can be restrained.

According to a 7th aspect of the invention, there is provided a fuel cell system comprising: a first valve placed in the communication passage located between the material gas feeder and the reformer; a second valve placed in the communication passage located between the fuel cell and the combustor; a third valve placed in the communication passage located between the fuel cell and the second valve; a branch passage configured to connect the communication passage located between the reformer and the fuel cell to the communication passage located between the third valve and the second valve; and a three-way valve placed at a joint between the communication passage located between the reformer and the fuel cell and the branch passage, wherein the material gas feed process includes: the fuel cell isolating operation for isolating the fuel cell from the fuel cell system by controlling the third valve and the three-way valve; the material gas feed operation for supplying the material gas to the communication passage excluding the isolated part, to the reformer and to the combustor, by controlling the first and second valves and the material gas feeder after the fuel cell isolating operation; and the closing operation for closing the hydrogen-containing gas flow path by controlling the first and second valves after the material gas feed operation. With this arrangement, the residual gas possibly containing air can be reduced or purged without letting it flow within the fuel cell. Therefore, the deterioration of the performance of the fuel cell caused by a flow of the residual gas possibly containing air can be restrained.

According to an 8th aspect of the invention, there is provided a fuel cell system comprising: a water-sealing type atmospheric opening system placed in the communication passage located between the third valve and the second valve and designed to cause an outflow of stored water once an internal pressure of the communication passage reaches a specified value or more so that its sealing function is lost, wherein during a shutdown period of the fuel cell, the controller detects presence/absence of the stored water in the atmospheric opening system, and wherein if a presence of the stored water is not detected, the controller determines that the fuel cell system is not in its normal condition and the water-sealing type atmospheric opening system is controlled to pour water into the water-sealing type atmospheric opening system in the material gas feed process. With this arrangement, the communication flow path is exposed to the atmosphere if an excessive pressure rise occurs in the communication passage for some reason such as the residual heat of the reformer after the shutdown operation of the fuel cell system. Therefore, damage to the fuel cell system caused by pressure can be prevented.

According to a 9th aspect of the invention, there is provided a fuel cell system wherein the combustor includes an air feeder and wherein the controller controls the air feeder, in the material gas feed process, such that exhaust gas flowing out from the combustor is diluted so as to have a concentration less than its combustible concentration. This arrangement restrains the possibility that exhaust gas may cause unexpected abnormal combustion on the exhaust port side of the combustor.

According to a 10th aspect of the invention, there is provided a fuel cell system further comprising: a connection passage configured to connect a part of the hydrogen-containing gas flow path located on an upstream side of an estimated air-entry range to the material gas feeder, the estimated air-entry range being a possible region which air enters from a downstream side, when the combustor side of the hydrogen-containing gas flow path is defined as the downstream side, wherein, in the material gas feed process, the material gas is supplied by way of the connection passage. The estimated air-entry range as stated herein means a possible region of the hydrogen-containing gas flow path which air enters when coming from the downstream side. Herein, the combustor side of the hydrogen-containing gas flow path is defined as the downstream side.

According to an 11th aspect of the invention, there is provided a method for operating a fuel cell system that comprises: a material gas feeder configured to supply a material gas; a reformer configured to reform the material gas into a hydrogen-rich hydrogen-containing gas; a fuel cell; a combustor configured to burn the material gas or the hydrogen-containing gas to supply heat to the reformer; and a communication passage configured to connect the material gas feeder, the reformer, the fuel cell and the combustor in order such that they are communicated with one another, during a shutdown period of the fuel cell, the method comprising: a step of determining whether the fuel cell system is in a normal condition in which a shutdown operation of the fuel cell is performed; and a step of supplying the material gas to at least a part of a hydrogen-containing gas flow path constituted by the reformer and the communication passage located between the reformer and the combustor by controlling the material gas feeder before the next ignition operation of the combustor if the controller determines that the fuel cell system is not in its normal condition. With this operation method, occurrence of abnormal combustion at the time of igniting the combustor can be prevented without use of inert gas. In addition, since this operation method is designed to determine the condition of the fuel cell system, occurrence of abnormal combustion at the time of igniting the combustor can be prevented while avoiding wasteful supply of the material gas.

These objects as well as other objects, features and advantages of the invention will become apparent to those skilled in the art from the following detailed description of preferred embodiments with reference to the accompanying drawings.

Effects of the Invention

According to the fuel cell system and operation method of the invention, abnormal combustion at the time of ignition of the combustor in cases where the fuel cell system is not in a normal condition can be prevented without causing an increase in the manufacturing cost and installation space of the fuel cell system and a wasteful supply of the material gas.

EXPLANATION OF REFERENCE NUMERALS

1: material gas feeder
2: water feeder
3: reformer
3A: reforming section
3B: shift converter
3C: selective oxidizer
4: fuel cell
4A: inlet (of an anode gas flow path)
4B: outlet (of the anode gas flow path)
5: combustor
5A: main body
5B: air feeder
6A-6E: communication passage
6F, 6G: branch passage
7: oxidizing gas feeder
9: steam generator
10: first valve
11: second valve
12: third valve
13: atmospheric opening system
14: three-way valve
14A: first valve port
14B: second valve port
14C: third valve port
15: fourth valve
20: controller
20A: control unit
20B: storage unit
20C: back-up power supply section
P: first flow path
Q: second flow path
S1-S4: step
S100, S200: material gas supplying step

BEST MODE FOR CARRYING OUT THE INVENTION

Referring now to the accompanying drawings, the best mode for carrying out the invention will be hereinafter described.

First Embodiment

Figure 1:
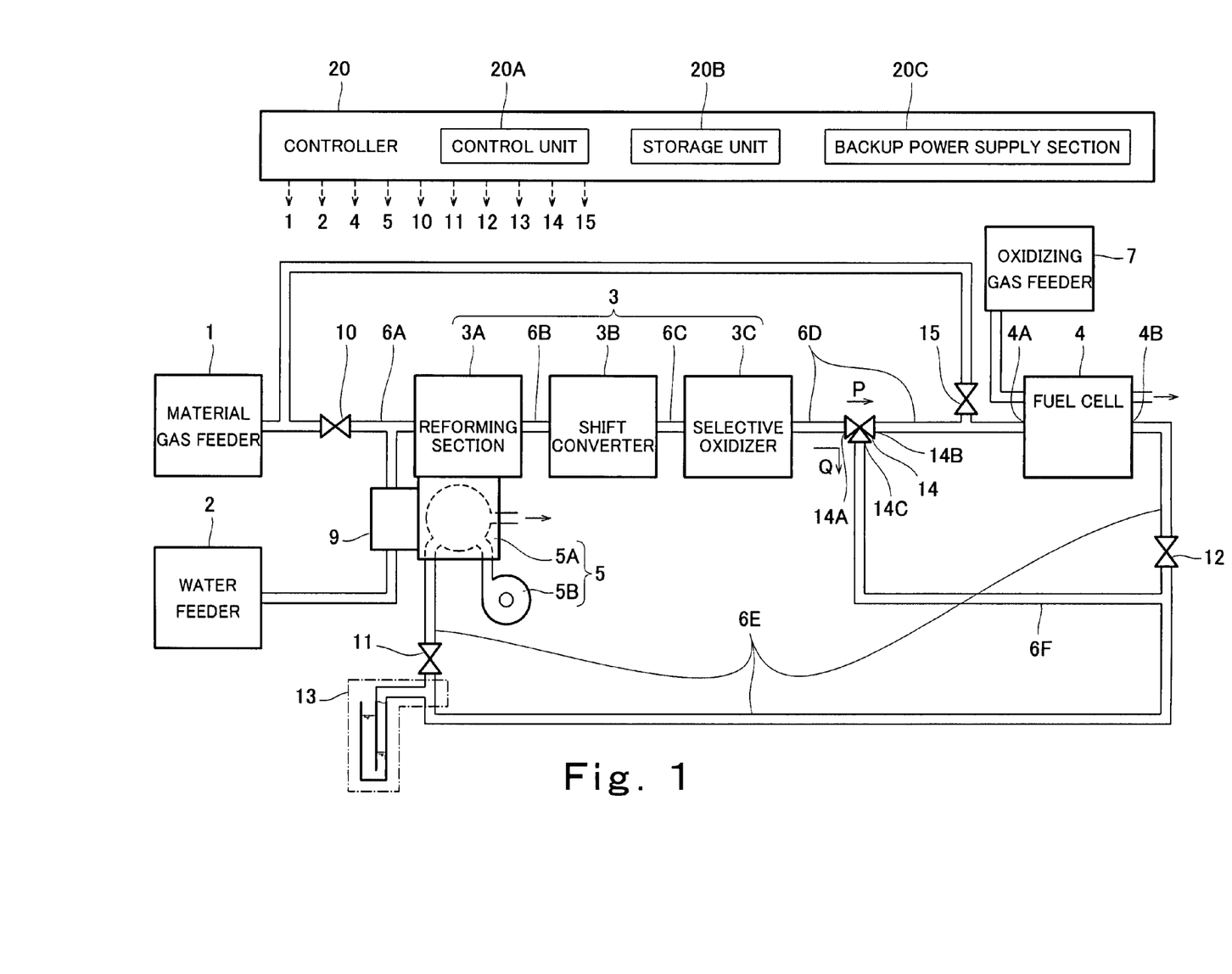
FIG. 1 is a pattern diagram schematically showing the structure of a fuel cell system according to a first embodiment.

FIG. 1 is a pattern diagram schematically showing the structure of a fuel cell system according to a first embodiment. The fuel cell system is composed of a material gas feeder 1; a water feeder 2; a reformer 3; a fuel cell 4; a combustor 5; communication passages 6A to 6E; branch passages 6F, 6G; a steam generator 9; first to third valves 10, 11, 12; an atmospheric opening system 13; a three-way valve 14; a fourth valve 15; and an oxidizing gas feeder 7.

The material gas feeder 1 is provided to supply a material gas to the communication passage 6A. Although not shown herein, city gas (natural gas) is used as the material gas. The material gas feeder 1 is constituted by a pump connected to a city gas infrastructure. The material gas feeder 1 also has a flow rate regulating device such as a needle valve, so that the supply flow rate of the material gas can be controlled. As the material gas feeder 1, a gas cylinder or the like filled with the material gas may be used. It should be noted that the material gas is not necessarily limited to city gas but may be any gases provided that they contain at least an organic compound composed of carbon and hydrogen.

The water feeder 2 is provided to supply water to the steam generator 9. Although not shown herein, the water feeder 2 is constituted by a plunger pump. The water feeder 2 has a flow rate regulating device such as an electromagnetic valve, so that water can be supplied and shut off.

The communication passage 6A connects the material gas feeder 1 to the reformer 3. The communication passages 6A to 6E and the branch passages 6F and 6G are each formed by a pipe that has resistance to corrosion caused by the material gas and hydrogen-containing gas and resistance to the supply pressure of these gases.

The steam generator 9 is configured to make use of the combustion heat of the combustor 5 to convert water into steam. The steam generated in the steam generator 9 is supplied to and mixed with the material gas in the communication passage 6A. The steam generated in the steam generator 9 may be mixed with the material gas within a reforming section 3A.

The reformer 3 has the reforming section 3A, a shift converter 3B, a selective oxidizer 3C and the communication passages 6B, 6C.

The communication passage 6B connects the reforming section 3A to the shift converter 3B.

The communication passage 6C connects the shift converter 3B to the selective oxidizer 3C.

The reforming section 3A is designed to cause the steam reforming reaction of the material gas mixed with steam, utilizing a catalytic action so that the material gas is reformed to create a hydrogen-containing gas. Generally, a nickel-based, ruthenium-based or rhodium-based catalyst is used.

The shift converter 3B is designed to cause a shift reaction of carbon monoxide contained in the hydrogen-containing gas through a catalytic action. Generally, a platinum-based or copper-zinc-based catalyst is used.

The selective oxidizer 3C is designed to cause selective oxidation of carbon monoxide contained in the hydrogen-containing gas through a catalytic action. Generally, a nickel-based or ruthenium-based catalyst is used. Although not shown in the drawings, the selective oxidizer 3C is supplied with air as the oxidizing gas necessary for the selective oxidation reaction. For instance, an air pump and an air flow path are disposed so as to supply air to the selective oxidizer 3C.

Connected to the reforming section 3A is the communication passage 6A through which the material gas is supplied from the material gas feeder 1 to the reforming section 3A. Connected to the selective oxidizer 3C is the communication passage 6D through which the hydrogen-containing gas is supplied from the selective oxidizer 3C to the fuel cell 4.

The communication passage 6D connects the reformer 3 to the fuel cell 4.

The fuel cell 4 consists of a polymer electrolyte fuel cell. The communication passage 6D is connected to an inlet 4A of the fuel cell 4 (more particularly, the inlet 4A of an anode gas flow path of the fuel cell 4) and the hydrogen-containing gas is supplied from the selective oxidizer 3C to the fuel cell 4 through the communication passage 6D. The communication passage 6E is connected to an outlet 4B of the anode gas flow path of the fuel cell 4 and excessive hydrogen-containing gas discharged from the fuel cell 4 is supplied to the combustor 5 through the communication passage 6E.

The communication passage 6E connects the fuel cell 4 to the combustor 5.

The combustor 5 is constituted by a main body 5A and an air feeder 5B. The main body 5A adjoins the reforming section 3A and the air feeder 5B is designed to supply air to the main body 5A. Connected to the main body 5A is the communication passage 6E through which the hydrogen-containing gas or the material gas is supplied. Within the main body 5A, the hydrogen-containing gas or the material gas is mixed with air and ignited by an igniting device (not shown) for combustion. Thereby, the heat necessary for the steam reforming reaction can be supplied to the reforming section 3A and the heat necessary for the vaporization of water can be supplied to the steam generator 9. The exhaust gas after combustion is released to the atmosphere from the main body 5A.

Herein, a discharge spark generator such as a spark plug is used as the igniting device. The igniting operation of the combustor 5 is executed by applying current to the discharge spark generator and the igniting operation time can be prolonged by extending an energizing time to the discharge spark generator. To prevent troubles such as adhesion between the electrodes of the discharge spark generator, the energizing time may be divided into a plurality of periods and the total energizing time may be extended for prolonging the igniting operation time. It should be noted that the igniting device is not necessarily limited to the discharge spark generator but may be of any other types generally used in the field and the igniting operation time may be prolonged according to the types of the igniting device.

As the air feeder 5B, a known feeder capable of flow control is employed. In this embodiment, a sirocco fan is used. The sirocco fan is designed to adjust the supply flow rate according to rotational speed control.

The first valve 10 is an electromagnetic valve of the so-called normally-closed type that is closed when the driving power source is shut off. The first valve 10 is placed in the communication passage 6A.

The second valve 11 is an electromagnetic valve of the so-called normally-closed type that is closed when the driving power source is shut off. The second valve 11 is placed in the communication passage 6E.

The third valve 12 is an electromagnetic valve of the so-called normally-open type that is open when the driving power source is shut off. The third valve 12 is placed between the fuel cell 4 and the second valve 11 in the communication passage 6E.

The atmospheric opening system 13 is placed between the third valve 12 and the second valve 11 in the communication passage 6E and normally cuts the communication passage 6E off from the atmosphere. The atmospheric opening system 13 makes the communication passage 6E open to the atmosphere and keeps it in this open condition once the internal pressure of the communication passage 6E rises and the differential pressure between the internal pressure and the atmospheric pressure becomes equal to or higher than a specified value. Herein, a water-sealing type atmospheric opening system that seals the communication passage 6E utilizing the water storage tank is used. Specifically, the communication passage 6E is normally cut off from the atmosphere by the head of the stored water. And, when the internal pressure of the communication passage 6E rises, the water within the water storage tank overflows and is discharged based on the difference between the atmospheric pressure and the internal pressure of the communication passage 6E so that the communication passage 6E is exposed to the atmosphere and thus its sealing function is lost. This atmospherically open condition is maintained. The sealing state of the water-sealing type atmospheric opening system can be restored by pouring water into the water storage tank using a water injector (not shown). The atmospheric opening system 13 may be replaced with other devices such as a combination of a pressure relief valve and a vacuum breaker valve.

The three-way valve 14 is disposed in the communication passage 6D. The three-way valve 14 is designed to switch from a first flow path P to a second flow path Q or vice versa, as shown in FIG. 1. The first flow path P connects a first valve port 14A to a second valve port 14B, thereby connecting the communication passage 6D on the side of the reformer 3 to the communication passage 6D on the side of the fuel cell 4. The second flow path Q connects the first valve port 14A to the third valve port 14C, thereby connecting the communication passage 6D on the side of the reformer 3 to the branch passage 6F. The three-way valve may be replaced by a flow path switching device composed of three valves provided for the passages respectively.

The branch passage 6F is disposed so as to connect the third valve port 14C of the three-way valve 14 to the portion of the communication passage 6E located between the third valve 12 and the second valve 11. Thereby, a bypass by which a flow of the hydrogen-containing gas can avoid the fuel cell 4 is established by switching the three-way valve 14 to the second flow path Q.

The branch passage 6G is disposed so as to connect the portion of the communication passage 6A located between the material gas feeder 1 and the first valve 10 to the portion of the communication passage 6D located between the three-way valve 14 and the fuel cell 4.

The fourth valve 15 is an electromagnetic valve of the so-called normally closed type that is closed when the driving power source is cut off and placed in the branch passage 6G.

The oxidizing gas feeder 7 is disposed so as to supply the fuel cell 4 with air that serves as the oxidizing gas. As the oxidizing gas feeder 7, a blower is used. The blower is designed to adjust the supply flow rate of air by rotational speed control.

A controller 20 controls the operation of the fuel cell system. More specifically, the controller 20 is constituted by a control unit 20A consisting of a microcomputer or the like; a storage unit 20B consisting of the control unit 20A and a memory or the like; and a backup power supply section 20C consisting of a capacitor etc. The meaning of the controller as stated herein does not only indicate a single controller but includes a controller group consisting of a plurality of controllers that cooperate with one another to execute control. Therefore, the controller 20 is not necessarily constituted by a single controller but may be constituted by a plurality of controllers that are disposed at discrete positions so as to control the operation of the fuel cell system in cooperation with one another.

Next, the operation of the fuel cell system when the fuel cell 4 is in service will be schematically described.

This operation is performed through the control of the controller 20.

First, the material gas (that is natural gas herein) is supplied to the reforming section 3A through the communication passage 6A by means of the material gas feeder 1. Water is supplied to the steam generator 9 by the water feeder 2. The steam generated by the steam generator 9 is supplied to the communication passage 6A and added to the material gas flowing in the communication passage 6A. The material gas to which steam has been added is supplied to the reforming section 3A. The controller 20 controls the flow rate of the water feeder 2 such that the amount of steam to be added to the material gas is equal to or more than the molar ratio of the steam reforming reaction. Thereby, moisture that is sufficient in amount in view of the molar ratio balance can be supplied and therefore a shortage of steam due to fluctuations in the supply flow rate of the material gas etc. can be avoided.

In the reforming section 3A, the material gas is heated to the activation temperature of the catalyst (this temperature is about 650° C. in the case of ruthenium-based catalysts) so that the reforming reaction between the material gas and steam proceeds, generating hydrogen-containing gas.

The hydrogen-containing gas generated in the reforming section 3A is supplied to the shift converter 3B by way of the communication passage 6B. In the shift converter 3B, the hydrogen-containing gas is kept at the activation temperature of the catalyst (that is about 250° C. in the case of platinum-based catalysts) and the shift reaction of carbon monoxide contained in the hydrogen-containing gas proceeds on the catalyst, so that the carbon monoxide concentration of the hydrogen-containing gas decreases.

The hydrogen-containing gas which has passed through the shift converter 3B is supplied to the selective oxidizer 3C by way of the communication passage 6C. In the selective oxidizer 3C, the hydrogen-containing gas is kept at the activation temperature of the catalyst (that is about 120 to 160° C. in the case of platinum-based catalysts) and the selective oxidation reaction between the carbon monoxide of the hydrogen-containing gas and oxygen proceeds on the catalyst, so that the carbon monoxide concentration of the hydrogen-containing gas further decreases.

The hydrogen-containing gas which has passed through the selective oxidizer 3C is supplied to the fuel cell 4 by way of the communication passage 6D. In the fuel cell 4, the hydrogen of the hydrogen-containing gas is consumed by the electrochemical reaction. Meanwhile, air is supplied to the fuel cell 4 from the oxidizing gas feeder 7. The three-way valve 14 is maintained so as to establish the first flow path P.

Excessive unreacted hydrogen-containing gas is discharged from the fuel cell 4 and supplied to the main body 5A of the combustor 5 by way of the communication passage 6E. In the combustor 5, the air feeder 5B is controlled to add air to the hydrogen-containing gas so that the hydrogen-containing gas is diluted to the combustible concentration and combusted. The heat of the combustion is supplied to the steam generator 9 and the reforming section 3A. Combustion exhaust gas is discharged to the atmosphere. Meanwhile, excessive unreacted air is discharged from the fuel cell 4 and properly treated.

Next, the operation of the fuel cell system when the shutdown operation of the fuel cell 4 is performed will be described.

First, a material gas supply stopping step, a fuel cell isolation step and a combustor stopping step are performed in random order.

Specifically, in the material gas supply stopping step, the material gas feeder 1 is stopped and the first valve 10 is closed.

In the fuel cell isolation step, the three-way valve 14 is switched so as to establish the second flow path Q and the third valve 12 is closed. Thereby, the fuel cell 4 is isolated from the fuel cell system while the hydrogen-containing gas being left in the fuel cell 4. That is, since the fuel cell 4 is full of the hydrogen-containing gas that contains steam when the fuel cell system is shut down in a normal condition, the wet condition of the polymer electrolyte membrane is maintained and therefore deterioration of the performance of the polymer electrolyte fuel cell can be restrained.

In the combustor stopping step, the combustion reaction of the combustor 5 is stopped. For instance, the air supply flow rate of the air feeder 5B is increased so that the hydrogen-containing gas is diluted so as to have a concentration lower than the combustible concentration, or alternatively, the supply of air from the air feeder 5B is stopped so that oxygen runs short, causing putting out the fire and stopping the combustor 5.

While the supply of water from the water feeder 2 continues, water vaporization continues in the steam generator 9 owing to the residual heat of the combustor 5. The steam is supplied to the reformer 3 by way of the communication passage 6A and then to the combustor 5 by way of the communication passage 6D, the branch passage 6F and the communication passage 6E. Thereby, the evaporation heat of water deprives the combustor 5 of the residual heat, so that the catalytic reaction occurring in the reformer 3 and more particularly in the reforming section 3A, the shift converter 3B and the selective oxidizer 3C stops. The hydrogen-containing gas remaining in the communication passage 6A, the reformer 3, the communication passage 6D, the branch passage 6F, the communication passage 6 and the combustor 5 is forced out by steam and discharged to the atmosphere from the combustor 5. Accordingly, the hydrogen-containing gas remaining in these members are purged by steam. It should be noted that the removal of the heat of the reformer 3 may be carried out by air cooling, that is, sending air to the reformer 3 from the outside by a fan. Alternatively, a cooling pipe may be provided for the reformer and the heat removal may be carried out by circulating a cooling medium.

After the temperature of the inside of the reforming section 3A is sufficiently decreased and, more particularly, decreased to a value lower than the reforming reaction temperature of the material gas, the material gas supplying step is executed. Specifically, the material gas feeder 1 is operated, the first valve 10 is opened, and the material gas is supplied to the communication passage 6A. Thereby, the material gas is supplied to the inside of the fuel cell system excluding the fuel cell 4 and more particularly to the communication passage 6A, the reformer 3, the communication passage 6D, the branch passage 6F, the communication passage 6E and the combustor 5. The steam remaining in these members is forced out by the material gas and discharged to the atmosphere from the combustor 5. That is, steam is purged. After purging steam, the material gas feeder 1 is stopped, thereby terminating the material gas supplying step. Determination on whether or not the material gas supplying step has been terminated is done by checking the supplied amount of the material gas by the control unit 20A. More specifically, the supply flow rate of the material gas is obtained from the material gas feeder 1 and the supplied amount of the material gas is obtained from this supply flow rate and feeding time. Then, a check is made to determine whether or not the supplied amount of the material gas has reached a value equal to or more than the volume of the hydrogen-containing gas flow path, and if so, it is determined that the reduction or purging of air that entered the hydrogen-containing gas flow path has been completed. Alternatively, this determination may be simply made according to the feeding time of the material gas. Specifically, the feeding time of the material gas may be preset according to the supply flow rate of the material gas feeder and the volume of the hydrogen-containing gas flow path.

Then, the closing step is performed. That is, the first and second valves 10, 11 are closed. Thereby, the hydrogen-containing gas is sealed in the fuel cell 4 whereas the material gas is sealed in other areas of the fuel cell system (the normal condition). In the controller 20, data indicative of the normal condition is stored in the storage unit 20B. Concretely, the data is stored by setting a flag in the storage unit 20B.

If the fuel cell system stops without performing the shutdown operation for some reason such as a power failure, malfunction or false operation of the fuel cell system (this condition is hereinafter referred to as "emergency stop"), the first valve 10 and second valve 11, which are of the normally-closed type, are brought into their closed state whereas the third valve 12, which is of the normally-open type, is brought into its open state. The three-way valve 14 is left in a state where the first flow path P is established while the fuel cell system is in service. Thereby, the material gas feeder 1 and the water feeder 2 are stopped, the fire of the combustor 5 has gone out, and the hydrogen-containing gas is sealed in the fuel cell system. The back-up power supply section 20C tentatively supplies electric power to the controller 20 and information indicating that the fuel cell system has stopped without performing the shutdown operation (emergency stop information) is stored in the storage unit 20B.

The hydrogen-containing gas within the reforming section 3A is heated by the residual heat in the combustor 5 and therefore expanded in volume so that the internal pressure of the communication passage 6E rises. In this situation, if the internal pressure of the communication passage 6E exceeds a specified value, the atmospheric opening system 13 opens the communication passage 6E to the atmosphere so that the hydrogen-containing gas is discharged to the atmosphere from the atmospheric opening system 13.

The residual heat in the reforming section 3A decreases with temperature starting to drop, and then, the volume of the hydrogen-containing gas within the fuel cell system contracts. Subsequently, atmospheric air enters the communication passage 6E through the atmospheric opening system 13 so that a mixture of the hydrogen-containing gas and air is generated in the fuel cell system.

Next, the operation of the fuel cell system at start-up of the fuel cell 4 will be explained.

Figure 2:
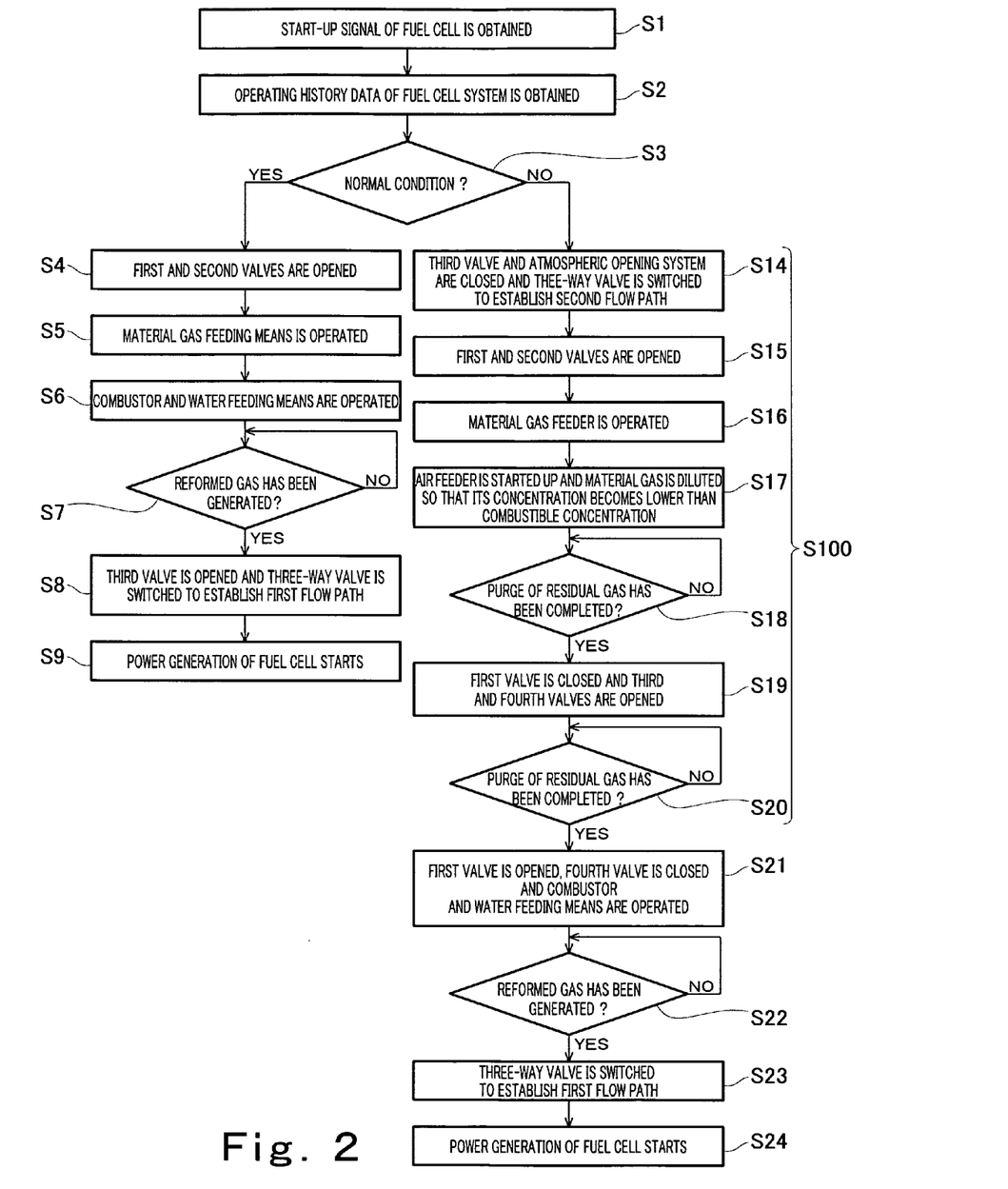
FIG. 2 is a flow chart exemplifying the start-up operation of a fuel cell in the fuel cell system of the first embodiment.

FIG. 2 is a flow chart exemplifying the start-up operation of a fuel cell in the fuel cell system of the first embodiment.

In Step S1, the control unit 20A receives a command signal for instructing start-up of the fuel cell 4. Although not shown in the drawings, the command signal for instructing start-up of the fuel cell 4 is generally transmitted in response to an ON signal for turning on the fuel cell and the fuel cell system or in response to a power load of the electric power system that is connected with the fuel cell 4. This command signal is input to the control unit 20A.

In Step S2, the control unit 20A obtains the operating history data of the fuel cell system. Concretely, the control unit 20A takes in the operating history data stored in the storage unit 20B.

In Step S3 (the determination step), the control unit 20A determines whether the fuel cell system is in its normal condition. More concretely, the control unit 20A determines whether or not the fuel cell system is in its normal condition according to whether or not the information indicating that the fuel cell system is in its normal condition exists in the operating history data which the control unit 20A takes from the storage unit 20B. Alternatively, if the emergency stop information does not exist and the fuel cell system is in its sealed condition, it may be determined that the fuel cell system is in its normal condition. The normal condition means a condition of the fuel cell system in which the shutdown operation of the fuel cell 4 is performed and further includes a condition in which the fuel cell system executes the shutdown operation and the condition after the shutdown operation is not maintained.

It is judged that the fuel cell system is in its sealed condition, if the control unit 20A determines that the second valve 11 is in its closed state and the atmospheric opening system 13 is in its closed state. Concretely, the control unit 20A receives an opening/closing signal associated with the second valve 11 or a detection signal from a detector (not shown) for detecting the position of the valve element, that is, a position sensor, thereby obtaining opening/closing information on the second valve 11. In addition, the control unit 20A receives a detection signal from a water level sensor (not shown) for the atmospheric opening system 13, thereby obtaining opening/closing information on the atmospheric opening system 13. If the above two pieces of opening/closing information both indicate the closed state, it is then determined that the fuel cell system is in its sealed condition.

In Step S4, the control unit 20A opens the first and second valves 10, 11.

In Step S5, the control unit 20A actuates the material gas feeder 1 to supply the material gas. Thereby, the material gas is supplied to the communication passage 6A, the reformer 3, the communication passage 6D, the communication passage 6E, the branch passage 6F, the communication passage 6E and the combustor 5 in order.

In Step S6, the control unit 20A actuates the combustor 5 and the water feeder 2, thereby starting steam generation in the steam generator 9 and heating of the reforming section 3A. More concretely, the control unit 20A controls the air feed rate of the air feeder 5B to make the material gas in the main body 5A have the combustible concentration so that the material gas is ignited. Thereby, heating of the reforming section 3A is started. After the steam generator 9 is warmed up to a specified temperature, the control unit 20A actuates the water feeder 2. Thereby, steam generation in the steam generator 9 is started.

In Step S7, the control unit 20A determines whether the hydrogen-containing gas has been generated. The control unit 20A receives a detection signal from a temperature detector (not shown) provided in the reforming section 3A to compare the internal temperature of the reforming section 3A with the catalytic reaction temperature and if the internal temperature of the reforming section 3A has reached the catalytic reaction temperature, it is determined that the hydrogen-containing gas has been generated. If it is determined that the hydrogen-containing gas has been generated, the program proceeds to Step S8.

In Step S8, the control unit 20A opens the third valve 12 and switches the three-way valve 14 to establish the first flow path P. Thereby, the hydrogen-containing gas is supplied to the fuel cell 4.

In Step S9, the control unit 20A starts up the fuel cell, thereby generating electric power.

In the above process, since the fuel cell system does not perform the material gas supplying operation in cases where it is determined that the fuel cell system is in its normal condition after receiving a start-up signal, the fuel cell 4 can be quickly started up.

In Step S3, the program proceeds to Step S14 if it is determined that the fuel cell system is not in the normal condition. That is, if information indicative of the normal condition is not detected, the program proceeds to Step S14. An alternative arrangement is such that if the emergency stop information is detected or if information indicative of the normal condition is detected but the fuel cell is not in its sealed condition (i.e., at least either the second valve 11 or the atmospheric opening system 13 is open), it is then determined that the fuel cell system is not in its normal condition and therefore the program proceeds to Step S14.

In Step S14 (the fuel cell isolation step), the control unit 20A closes the third valve 12 and the atmospheric opening system 13 and switches the three-way valve 14 to establish the second flow path Q. The closing of the third valve 12 and the establishment of the second flow path Q cause the fuel cell 4 to be isolated from other elements of the fuel cell system. The atmospheric opening system 13 is closed by poring water by use of a water injector (not shown).

The closing of the atmospheric opening system 13 is closing of the portion of the fuel cell system exposed to the atmosphere and does not relate to the isolation of the fuel cell 4. Therefore, the closing of the atmospheric opening system 13 may be controlled separately from and prior to Step S14.

In Step S15, the control unit 20A opens the first and second valves 10, 11.

In Step S16 (the first material gas supplying step), the control unit 20A actuates the material gas feeder 1 to supply the material gas. Thereby, the material gas is supplied to the communication passage 6A, the reformer 3, the communication passage 6D, the communication passage 6E, the branch passage 6F, the communication passage 6E and the combustor 5 in order. Air which has entered the hydrogen-containing gas flow path within the reformer 3 and communication passages 6A to 6D can be reduced or purged by the material gas without causing the residual gas possibly containing air to flow within the fuel cell 4. It is, therefore, possible to restrain deterioration of the performance of the fuel cell 4 due to a flow of the residual gas possibly containing air.

In Step S17, the control unit 20A actuates the air feeder 5B of the combustor 5. Concretely, the control unit 20A controls the air supply flow rate of the air feeder 5B such that the residual gas within the hydrogen-containing gas flow path comes to have a concentration less than the combustible concentration and is discharged from the combustor 5. Thereby, the exhaust gas discharged from the combustor 5 can be prevented from causing unexpected abnormal combustion at the exhaust side of the combustor 5.

Next, in Step S18, the control unit 20A determines whether the air which entered the hydrogen-containing gas flow path has been reduced or purged by the material gas. Herein, the control unit 20A makes this determination based on the amount of the material gas supplied per hour, that is, the supply flow rate. Specifically, the supply flow rate of the material gas is obtained from the material gas feeder 1, and the amounts of the material gas supplied in the Step S19 and subsequent steps are accumulated, thereby obtaining the supplied amount of the material gas. The supplied amount of the material gas is compared to the hydrogen-containing gas flow path volume, and if this supplied amount is not less than the hydrogen-containing gas flow path volume or the percentage of the supplied amount with respect to the hydrogen-containing gas flow path volume is equal to or higher than a specified value, it is determined that the reduction or purging of the air which entered the hydrogen-containing gas flow path has been completed. Then, the program proceeds to Step S19. Thereby, the amount of the material gas required for reducing or purging the air which has entered the hydrogen-containing gas flow path can be supplied. Alternatively, the determination may be simply made according to the feeding time of the material gas. That is, the feeding time of the material gas may be preset from the supply flow rate of the material gas feeder 1 and the hydrogen-containing gas flow path volume.

The hydrogen-containing gas flow path discussed herein is a flow path for the hydrogen-containing gas that extends from the reformer 3 to the combustor 5, bypassing the fuel cell 4. More specifically, the hydrogen-containing gas flow path is constituted by the reformer 3, the communication passages 6A to 6C, parts of the communication passage 6D, 6E and the branch passage 6F. Alternatively, the hydrogen-containing gas flow path may be a flow path through which the hydrogen-containing gas flows from the reformer 3 to the combustor 5 by way of the fuel cell 4, as described later in the second embodiment. Herein, the hydrogen-containing gas flow path is constituted by the reformer 3 and the communication passages 6A to 6E that extend from the reformer 3 to the combustor 5. The hydrogen-containing gas flow path volume is the volume of the hydrogen-containing gas flow path.

Where supply of the material gas up to an amount equal to or more than the hydrogen-containing gas flow path volume is allowed, the material gas can be supplied in the amount required for purging the air that has entered the hydrogen-containing gas flow path.

Where the fuel cell 4 is stopped without performing the material gas supplying step of the shutdown operation of the fuel cell 4, the hydrogen-containing gas remains in the hydrogen-containing gas flow path and air enters the hydrogen-containing gas flow path from the combustor 5. Therefore, it is adequate to set the specified percentage with respect to the hydrogen-containing gas flow path volume to such a value that at least most of the air that has entered the hydrogen-containing gas flow path can be discharged from the combustor 5 and the hydrogen concentration of the hydrogen-containing gas present in the hydrogen-containing gas flow path exceeds the upper limit of the combustible range. For instance, the amount of entered air and the air-entry range of the hydrogen-containing gas flow path can be estimated and the necessary amount of the material gas can be calculated, based on the elapsed time since the fuel cell 4 stops and general diffusion simulations or actual measurements/tests conducted beforehand. This enables rational cut-down of the amount of the material gas to be supplied.

In Step S19 (second material gas supplying step), the first valve 10 is closed and the third and fourth valves 12, 15 are opened. Thereby, the material gas is supplied to the fuel cell 4 by way of the branch passage 6G.

In Step S20, the control unit 20A determines whether the air that entered the flow path of the fuel cell 4 has been reduced or purged, in the manner similar to that of Step S18. Specifically, the control unit 20A obtains the material gas supply flow rate from the material gas feeder 1 and accumulates the amounts of the material gas supplied in Step 19 and subsequent steps, thereby calculating the supplied amount of the material gas. The supplied amount of the material gas is compared to the flow path volume of the fuel cell 4 to determine whether or not the reduction or purging of the air that has entered the flow path of the fuel cell 4 has been completed. If it is determined the reduction or purging of the air that has entered the flow path of the fuel cell 4 has been completed, the program proceeds to Step S21.

Herein, the material gas supplying step (material gas supplying operation) S100 for causing a flow of the material gas in the reformer 3, the fuel cell 4, the combustor 5 and the communication passages 6A to 6E is constituted by Steps S14 to S20.

Next, the start-up operation of the fuel cell 4 is performed in Steps S21 to S24.

In Step S21, the control unit 20A opens the first valve 10, closes the fourth valve 15, and operates the combustor 5 and the water feeder 2, thereby starting steam generation in the steam generator 9 and heating of the reforming section 3A. Concretely, the control unit 20A controls the air supply flow rate of the air feeder 5B such that the material gas in the main body 5A has the combustible concentration and the material gas is ignited. Concretely, the control unit 20A obtains the supply flow rate of air from the air feeder 5B and the supply flow rate of the material gas from the material gas feeder 1 to calculate the diluent concentration of the material gas from these supply flow rates. This diluent concentration is compared to the combustible concentration of the material gas, and the air supply flow rate of the air feeder 5B is adjusted such that the material gas has the combustible concentration. Thereby, heating of the reforming section 3A is started. After the steam generator 9 is warmed to a specified temperature, the control unit 20A actuates the water feeder 2. Thereby, steam generation starts in the steam generator 9.

In the igniting operation of the combustor 5, the time taken for ignition is extended in comparison with the igniting time in the normal condition. Concretely, the total energizing time of the discharge spark generator is prolonged. Even when the amount of oxygen contained in the air that has entered the hydrogen-containing gas flow path is reduced by the material gas supplying operation S100 such that the hydrogen contained in the hydrogen-containing gas has concentration higher than the upper limit of the combustible range, incombustible components such as nitrogen contained in the air will be left unless the air that has entered the path is completely purged. Owing to the presence of the incombustible components, it takes time to discharge the residual gas and ignite the combustor 5 and, in consequence, there is a risk that the combustor 5 fails in igniting. The above arrangement makes it possible to smoothly carry out the start-up operation of the fuel cell 4 without causing a failure in ignition.

In Step S22, the control unit 20A determines whether or not hydrogen-containing gas containing a sufficient amount of hydrogen and excluding carbon monoxide has been generated. Concretely, the controller 20A obtains a detection signal from a temperature detector (not shown) provided in the reforming section 3A and makes comparisons between the inner temperatures of the reforming section 3A, the shift converter 3B and the selective oxidizer 3C and their catalytic reaction temperatures respectively. If the inner temperatures of these members have reached their associated catalytic reaction temperatures respectively, it is determined that the hydrogen-containing gas has been generated. Alternatively, the determination on whether the hydrogen-containing gas has been generated may be made by detecting the gas components within the reformer 3. More concretely, the selective oxidizer 3C is provided with gas detectors (not shown) such as a hydrogen sensor and carbon monoxide sensor. The control unit 20A obtains detection signals to compare the detected hydrogen concentration and detected carbon monoxide concentration within the selective oxidizer 3 with set hydrogen concentration and set carbon monoxide concentration, respectively, that are allowable for the hydrogen-containing gas. If the detected hydrogen concentration exceeds the set hydrogen concentration and the detected carbon monoxide concentration is lower than the set carbon monoxide concentration, it is determined that the hydrogen-containing gas has been generated.

If generation of the hydrogen-containing gas has been determined, the program proceeds to Step S23.

In Step S23, the control unit 20A switches the three-way valve 14 so as to establish the first flow path P. Thereby, the hydrogen-containing gas is supplied to the fuel cell 4. In the fuel cell system of the invention, since this causes the fuel cell 4 to be isolated from the fuel cell system until the hydrogen-containing gas containing a sufficient amount of hydrogen and excluding carbon monoxide is generated in the reformer 3, supply of gas containing a large amount of carbon monoxide to the fuel cell 4 at a start-up of the fuel cell 4 can be avoided with the result that exposure of the electrode catalysts of the fuel cell 4 to carbon monoxide can be prevented.

In Step S24, the control unit 20A starts up the fuel cell to generate electric power.

Second Embodiment

The second embodiment is a modification of the fuel cell system of the first embodiment, in which the material gas feed process is performed during the shutdown period of the fuel cell, without relation to the fuel cell startup operation. For instance, the material gas feed process is performed after the maintenance/checkup of the fuel cell system, based on a system restoration signal or a mode switching signal in the shutdown period of the fuel cell system. The second embodiment does not differ from the first embodiment in the structure of the fuel cell system and the operations of the fuel cell system during the fuel cell in service and during the fuel cell shutdown operation and therefore, an explanation thereof will be omitted herein.

Figure 3:
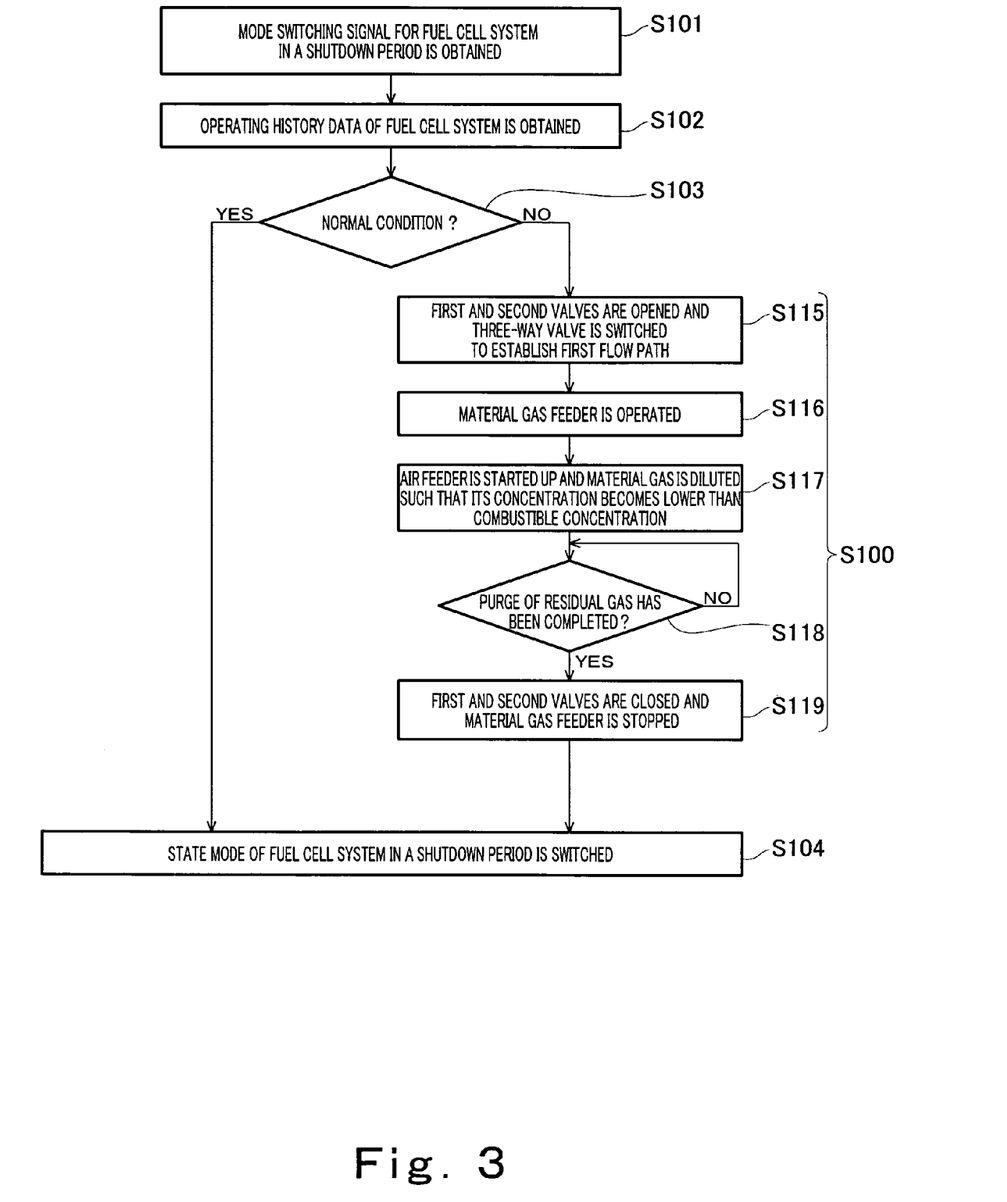
FIG. 3 is a flow chart exemplifying the operation in a shutdown period of a fuel cell in the fuel cell system of the second embodiment.

FIG. 3 is a flow chart exemplifying the operation in a shutdown period of a fuel cell in the fuel cell system of the second embodiment.

In Step S101, the control unit 20A receives a mode switching signal for the fuel cell system in a shutdown period. Herein, the mode switching signal for the fuel cell system in a shutdown period refers to a signal to instruct switching the operational states of the components of the fuel cell system except the fuel cell. For instance, this mode switching signal instructs switching its state mode in a shutdown period between a stop mode in which not only warm-up of the fuel cell but also substantially all of the components of the fuel cell system are stopped and a wait mode in which the fuel cell is warmed up to keep the fuel cell in a condition where it can start up quickly. This mode switching signal may be automatically issued by a timer provided in the controller 20 according to the length of the shutdown period of the fuel cell 4. Alternatively, it may be issued based on an operating plan for the fuel cell 4 that is programmed beforehand. Another alternative is such that it may be issued when the fuel cell system is restored by applying a current to the fuel cell system after a power cut state during a maintenance/checkup work of the fuel cell system or during the black out state.

Steps S102 and S103 are the same as Steps S2 and S3 shown in FIG. 2 and therefore an explanation thereof will be omitted herein.

If it is determined in Step S103 that the fuel cell system is in the normal condition, the program proceeds to Step S104 so that the fuel cell system is caused to switch its state mode in a shutdown period. For instance, the components of the fuel cell system except the fuel cell, such as the cooling system (not shown) for the fuel cell, are caused to switch their operational states.

If it is determined in Step S103 that the fuel cell system is not in the normal condition, the program proceeds to Step S115.

In Step S115, the control unit 20A opens the first and second valves 10, 11 and switches the three-way valve 14 so as to establish the first flow path P.

The program proceeds to Steps S116 to S118. Steps S116 to S118 are the same as Step S16 to S18 shown in FIG. 2 and therefore an explanation thereof will be omitted herein.

In Step S119, the first and second valves 10, 11 are closed and the material gas feeder 1 is stopped. This brings the fuel cell system into the sealed condition (normal condition) in which the material gas is sealed in the fuel cell system. In the controller 20, information indicative of the normal condition is stored in the storage unit 20B. More concretely, a flag is set in the storage unit 20B, thereby storing the information.

The program proceeds to Step S104, and the fuel cell system is caused to switch its state mode in a shutdown period.

Herein, the material gas supplying step S200 (the material gas feed process) is constituted by Steps S115 to S119.

Similarly to Steps S14 to S20 of the first embodiment, the program may be designed such that the fuel cell is isolated and the first and second material gas supplying steps are performed.

Thus, according to the fuel cell system of the invention exemplified by the first and second embodiments, if it is determined that the fuel cell system is not in the normal condition before the next igniting operation of the combustor 5, the air which has entered the hydrogen-containing gas flow path may be reduced or purged. This eliminates the need of providing the fuel cell system of the invention with an inert gas feeding system and therefore occurrence of abnormal combustion such as backfire directed from the combustor 5 toward the inside of the fuel cell system at the time of igniting the combustor 5 can be prevented while restraining an increase in the manufacturing cost and installation space of the fuel cell system.

According to the fuel cell system and operation method of the invention, a check is made to determine whether or not the fuel cell system is in the normal condition, and only if it is determined that the fuel cell system is not in the normal condition, the air that has entered the hydrogen-containing gas flow path can be reduced or purged by use of the material gas. In short, the unnecessary material gas feed process can be skipped according to the condition of the fuel cell system.

In the fuel cell system of the invention exemplified by the first embodiment, since the material gas feed process is performed using the material gas just before the igniting operation of the combustor if it is determined that the fuel cell system is not in the normal condition, abnormal combustion at the time of igniting the combustor can be more reliably prevented.

In the fuel cell system of the invention exemplified by the second embodiment, since the material gas feed process is performed using the material gas during the shutdown period of the fuel cell if it is determined that the fuel cell system is not in the normal condition, the air that has entered the hydrogen-containing gas flow path can be reduced or purged at an early time after shutdown of the fuel cell.

While the embodiments of the invention have been described in detail, it should be noted that the invention is not necessarily limited to these embodiments. It is apparent for those skilled in the art from the foregoing description that various modifications and other embodiments are possible for the invention. Accordingly, the foregoing description is to be construed as illustrative only, and is provided for the purpose of teaching those skilled in the art the best mode of carrying out the invention. The details of the structure and/or function maybe varied substantially without departing from the spirit of the invention.

For instance, the fuel cell system and operation method may be modified so as to incorporate both the first and second embodiments.

The air-entry range of the hydrogen-containing gas flow path, into which the air enters from the combustor 5, can be empirically estimated from the simulation analysis of air diffusion in the hydrogen-containing gas flow path and the arrangement of the communication passages and the valves (including valves not shown in the drawings) of the communication passages in the hydrogen-containing gas flow path. In the material gas supplying step, the material gas supplying position in the hydrogen-containing gas flow path can be separately arranged. Concretely, although not shown in the drawings, the fuel cell system and operation method may be designed such that when the position of the combustor 5 is defined as the downstream side of the hydrogen-containing gas flow path, a connecting passage is provided for connecting the part of the hydrogen-containing gas flow path located at the upstream side of an estimated air-entry range in the downstream side. And, in the material gas feed process, the material gas is supplied through the connecting passage. The estimated air-entry range as stated herein is a possible region of the hydrogen-containing gas flow path which air can enter, provided that the air is coming from the downstream side when the position of the combustor 5 is defined as the downstream side.

From an experience point of view, it is more preferable to construct the connecting passage such that the part of the hydrogen-containing gas flow path on the material gas feeder 1 side (i.e., the upstream side) of the three-way valve 14 is connected to the material gas feeder 1. For instance, the connecting passage may be constructed such that the part of the communication passage 6D between the reformer 3 and the three-way valve 14 or the communication passage 6B or the communication passage 6C is connected to the material gas feeder 1.

In the first embodiment, in Step S19, the third and fourth valves 12, 15 are opened, that is, the air that has entered the flow path of the fuel cell 4 is reduced or purged by use of the branch passage 6G. It is also possible to reduce or purge the air that has entered the flow path of the fuel cell 4 without use of the branch passage 6G. Concretely, Step S19 may be performed such that the control unit 20A opens the third valve 12 while opening the first valve 10 and switches the three-way valve 14 so as to establish the first flow path P. Thereby, the first and second material gas supplying steps can be performed without use of the branch passage 60.

INDUSTRIAL APPLICABILITY

The invention provides a useful fuel cell system and operation method that make it possible to prevent abnormal combustion at the time of igniting the combustor when the fuel cell system is not in the normal condition, while avoiding an increase in the manufacturing cost and installation space of the fuel cell system and wasteful supply of the material gas.

What is claimed is:

1. A method for operating a fuel cell system, said fuel cell system comprising a material gas feeder configured to supply a material gas;
   a reformer configured to reform the material gas into a hydrogen-containing gas;
   a fuel cell;
   a combustor configured to burn the material gas or the hydrogen-containing gas to supply heat to said reformer; and
   a communication passage configured to connect said material gas feeder, said reformer, said fuel cell and said combustor in order such that they are communicated with one another,
   said method comprising:
   a step (A) of determining whether or not an emergency stop has occurred in said fuel cell system; and
   a step (B) of causing said material gas feeder to supply the material gas to at least a part of a hydrogen-containing gas flow path constituted by said reformer and said communication passage located between said reformer and said combustor before a next ignition operation of said combustor, if it is determined that the emergency stop has occurred in said fuel cell system.

2. The method of operating a fuel cell system according to claim 1, wherein the step (B) is performed at least just before the next ignition of said combustor.

3. The method of operating a fuel cell system according to claim 1, wherein the step (B) is performed at least during a shutdown period of said fuel cell.

4. The method of operating a fuel cell system according to claim 1, wherein in the step (B), said material gas feeder supplies the material gas at least in an amount equivalent to a volume of said hydrogen-containing gas flow path.

5. The method of operating a fuel cell system according to claim 1, further comprising a step (C) of prolonging an ignition operation time in the next ignition operation of said combustor, if it is determined that the emergency stop has occurred in the fuel cell system.

6. The method of operating a fuel cell system according to claim 1, wherein said fuel cell system includes a branch passage configured to connect said communication passage located between said reformer and said fuel cell to said communication passage located between said fuel cell and said combustor; and
   wherein the step (B) includes:
   a step (B1) of isolating said fuel cell from said fuel cell system; and
   a step (B2) of supplying the material gas to a passage extending from said reformer to said combustor through said branch passage, after the step (B1).

7. The method of operating a fuel cell system according to claim 1, wherein said fuel cell system includes:
   a first valve placed in said communication passage located between said material gas feeder and said reformer;
   a second valve placed in said communication passage located between said fuel cell and said combustor;
   a third valve placed in said communication passage located between said fuel cell and said second valve;
   a branch passage configured to connect said communication passage located between said reformer and said fuel cell to said communication passage located between said third valve and said second valve; and
   a three-way valve placed at a joint between said communication passage located between said reformer and said fuel cell and said branch passage,
   wherein the step (B) includes:
   a step (B3) of isolating said fuel cell from said fuel cell system using said third valve and said three-way valve, and
   a step (B4) of supplying the material gas to said communication passage excluding said isolated part, to said branch passage, to said reformer and to said combustor, by using said first and second valves and said material gas feeder, after the step (B3).

8. The method of operating a fuel cell system according to claim 1,
   wherein the step (B) includes a step (B5) of supplying the material gas to a passage extending from said reformer to said combustor through said fuel cell.

9. The method of operating a fuel cell system according to claim 1,
   wherein said combustor includes an air feeder, and
   wherein the step (B) includes a step (B6) of diluting exhaust gas flowing out from said combustor so as to have a concentration less than its combustible concentration, using said air feeder.

* * * * *